Dec. 5, 1961  R. A. SHERMAN ET AL  3,011,394
DEVICE FOR TESTING VISUAL ACUITY
Filed April 23, 1959  3 Sheets-Sheet 1

INVENTORS
Reuel A. Sherman
Richard Feinberg

BY
ATTORNEYS

Dec. 5, 1961    R. A. SHERMAN ET AL    3,011,394
DEVICE FOR TESTING VISUAL ACUITY
Filed April 23, 1959    3 Sheets-Sheet 2

INVENTORS
Reuel A. Sherman
Richard Feinberg
BY
ATTORNEYS

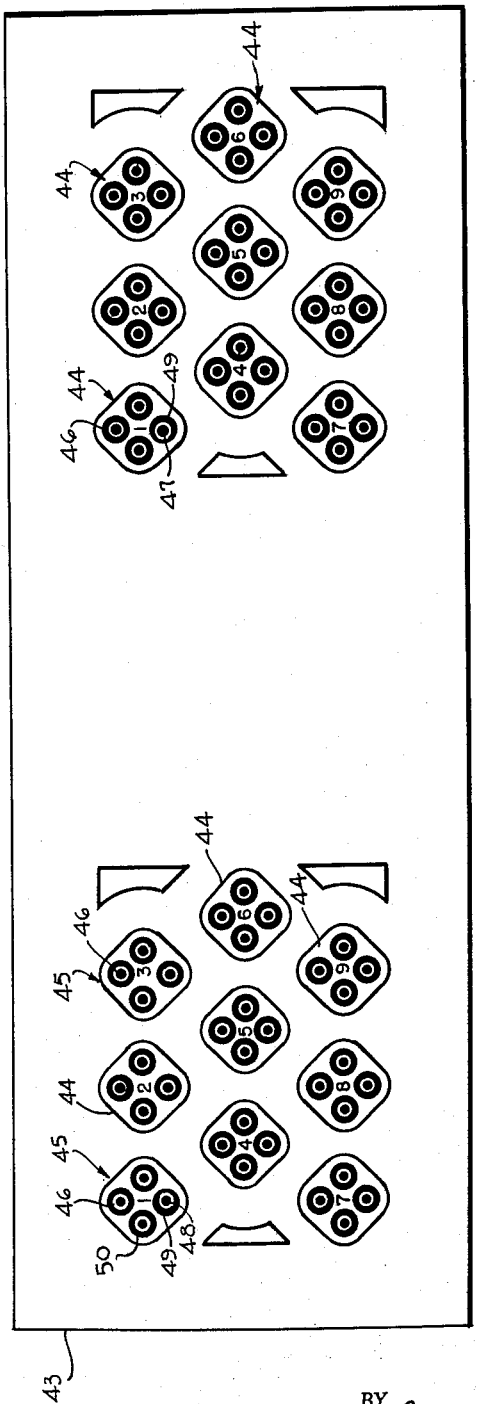

United States Patent Office 3,011,394
Patented Dec. 5, 1961

3,011,394
DEVICE FOR TESTING VISUAL ACUITY
Reuel A. Sherman, 220 Oak Hill Road, and Richard Feinberg, 2019 Windsor Road, both of Petersburg, Va.
Filed Apr. 23, 1959, Ser. No. 808,498
3 Claims. (Cl. 88—20)

This invention relates to ophthalmic instruments and has particular reference to an improved device for testing or determining visual acuity by use of a broken ring test chart.

The present application is a continuation-in-part of our co-pending application Serial No. 689,371, filed October 10, 1957, and now abandoned.

The broken ring, or Landolt ring, has heretofore been limited in its use because of difficulties encountered in test administration occasioned by the construction of a test chart carrying the rings. In testing with prior art charts carrying a broken ring, particular difficulty is encountered by both the tester and the subject in communication with each other as to which broken ring was being viewed.

Accordingly, it is an object of this invention to provide a broken ring test chart which eliminates all testing difficulties heretofore experienced.

It is a further object of this invention to provide a broken ring testing device which may be used to test literates, illiterates, or those unfamiliar with language used by the tester.

It is a still further and more particular object of this invention to provide a broken ring acuity test target which removes the possibility of ambiguity in responses to test questions concerning the identification of a broken ring.

It is yet another object of this invention to provide an acuity test target which enables rapid testing, without error and which assures an accurate measurement of the true seeing ability of each subject tested.

It is a still further object of this invention to provide a broken ring test target which accomplishes the above objects and which may be used in a stereoscopic instrument.

It is an even further object of this invention to provide a stereoscopic test slide which provides for testing any one eye at a time.

Another object consists in providing a steroscopic slide for accurately testing the acuity of both eyes or either eye at any distance near or far.

Additionally, the stereoscopic test slide may be provided with means for determining stereopsis for measuring the subject's ability to judge relative distances when all clues, except binocular triangulation, are eliminated. In this form the right and left images are fused to form a single array in which one circle in each group of four appears to "float out" or project toward the subject. The relative difficulty of each of the steps in this series is determined by the angular disparity of the "key" circle in each group. The level of difficulty may be expressed as a percentage of theoretical maximum stereopsis, according to a well-known formula.

Other objects and the advantages of the invention will become apparent when the following description is considered in conjunction with the accompanying drawings, wherein:

FIGURE 5 is a front view of a stereoscopic slide for measuring the subject's ability to judge relative distances.

Figure 1:
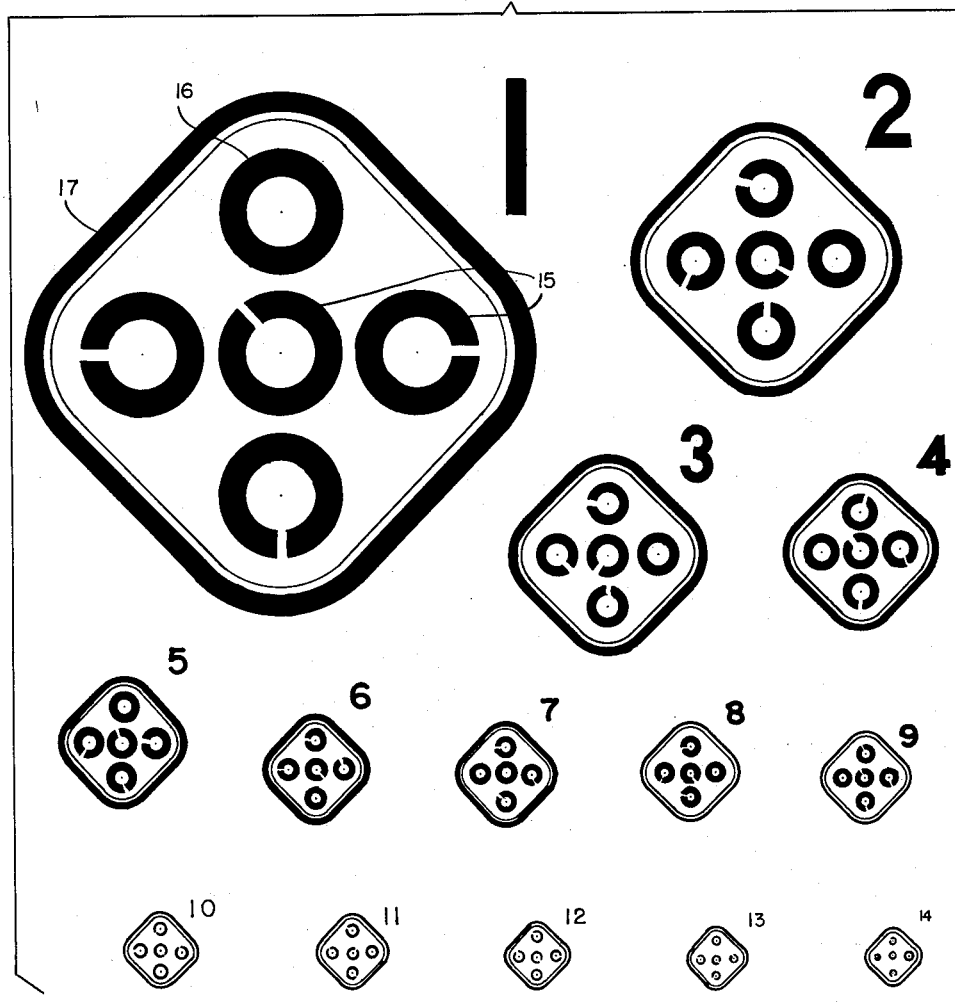
FIGURE 1 shows a test target of the type or types provided by this invention.

Referring to the drawings, the numerals 1 through 14 identify a plurality of spaced targets which are graded with respect to size and reproduced on a chart. Each target has the same form outline, namely, a square having rounded edges, and is oriented with the diagonal of the square in a vertical position. Within each square are arranged a plurality of broken rings 15 and an unbroken ring 16. In the preferred embodiment, each target has four identical non-critical rings 15 which serve as comparison references and a fifth critical ring 16. This arrangement serves as a means for testing the visual acuity of the eye under examination.

The non-critical rings 15 have the same internal and external diameter as the critical ring, the only difference being that the critical ring is closed. Each test target square 17 contains a group of rings which are spaced within the square in such a manner that one is at each corner, and one is in the middle. This allows for the person being tested to identify the unbroken ring by: (1) stating right, left, top, bottom, or center; (2) pointing to the right or left, or pointing up or down, or pointing directly to the chart to indicate the central ring; or (3) any other suitable means of communication.

The rings are preferably disposed such that there is one in each corner area of the substantially square target outline, and one centrally disposed within the outline.

The criterion of homogeneity, by means of which the subject identifies the critical ring, is the appearance to the subject of a difference between the critical and non-critical ring. The non-critical rings, aside from having the same radical dimensions, are designed to have substantially the same subjective tone, preferably a true black, when a white background is used, as that of the non-critical rings when the test target square is seen under such conditions of size, distance and illumination that it is rendered apparently non-homogeneous through non-resolution of its critical details. In other words, when the critical details of the ring 16 cannot be resolved by the eye under test, the non-critical rings 15 are not distinguishable from the critical ring 16.

In FIGURE 1, the plurality of target squares and companion rings are graded as to size. The squares are identical except as to size, and the rings contained within the squares are the same except as to size and except for the fact that the unbroken ring is located at a different position within the square. The location of the unbroken ring 16 at different positions eliminates the possibility of obtaining inaccurate results should the tested subject attempt to establish a definite pattern with regard to location of the unbroken ring.

Figure 2:
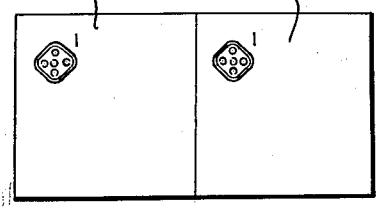
FIGURE 2 represents a stereoscopic slide illustratively carrying the targets of FIGURE 1.

In FIGURE 2 is shown a complete test slide in the form of a stereoscopic view 18. The view 18 has two front side portions 19 and 20. The view is designed for use in a stereoscopic instrument, in which the right eye, left eye and both eyes, may be tested without the subject becoming mentally aware of which eye is being tested. Assuming that the right was to be tested, FIGURE 2 shows, in exemplary form, the preferred construction of the view. Only one target square has been shown on each side. However, it should be understood that these targets are illustrative of the plurality of targets, as shown in FIGURE 1, actually carried thereon. It is to be noted that there is a difference between sides 19 and 20. The side 19 is of the same construction as the side 20 except for the fact that there is no unbroken ring 16 within the squares. Moreover, the rings and squares on side 20 are of a full tone, whereas the broken rings, aside from the companion to the unbroken ring 16, on the side 19, are of a half tone, instead of being definitely black or any other color, and the broken ring, which is a companion to unbroken ring 16, is of a gray tone, when the preferably white background is used. Of course, when the left eye is being tested, the unbroken rings are on side 19 and the side 19 is of a full tone, whereas the side 20, in such case, would contain half-tone corresponding broken rings and a gray broken ring corresponding to the unbroken rings. When both eyes are to be tested, the construction of both sides is identical in all respects. Also, in some cases, one side 19 of the slide 18 will have the rings omitted from the test areas or target squares 17 while the other side 20 will have the rings 15—16 in the target squares, as shown.

Although the invention has been described with particular regard to a white background, it should be understood that such coloring need not be used. Any full tone color may be used in conjunction with a half tone of that color when desired, and the unbroken rings 16 need not be gray, but may be any soft color which serves as a soft comparison companion for the color of the unbroken ring on the opposite side of the slide.

It should also be understood that a plurality of unbroken rings may be used with a broken ring in each test target square.

It should be understood that it is not necessary that five rings be used within a substantially square test target. Any pattern which allows for convenient identification of the critical ring may be used, and any number of rings within the substantially square outline may be provided without departing from the scope of this invention.

Figure 3:
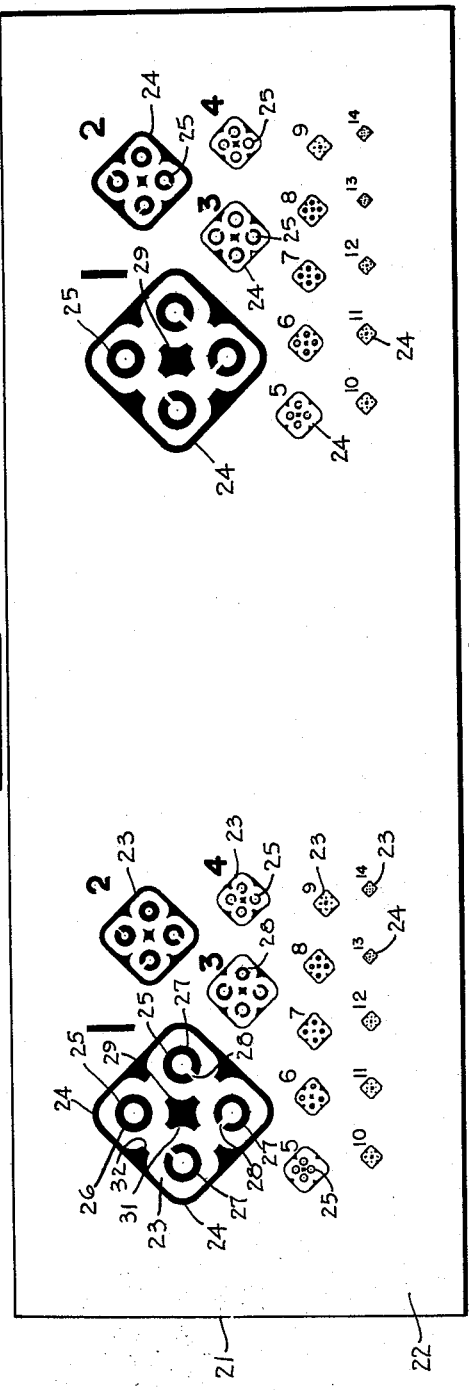
FIGURE 3 is a front view of a stereoscopic slide for testing the acuity of both eyes in accordance with the present invention.

In the form of the invention, shown in FIGURE 3, the stereoscopic slide 21 is constructed so as to be projected on a screen or may be used as a test chart, and has its front side or face 22 provided with two longitudinally spaced target areas in which are positioned a group of targets 23, marked 1 to 14 inclusively, arranged in rows. Each target 23 is substantially square shaped and has curved corners 24. The targets are progressively graduated as to size, and each includes a group of four curved rings or hollow characters 25 positioned within the same so that a ring is located adjacent each curved corner portion of the target. The rings 25 in each group are substantially the same externally and internally diameters as the other rings in this group. However, one of the rings, such as the ring 26, as shown in the large size target #1, is in the form of an unbroken critical ring, and the three other rings 27 of the same group are broken or interrupted as at 28 to provide non-critical rings that serve as confusion areas so as to insure simple, efficient, and positive means for accurately determining the visual acuity of both eyes or either eye at a minimum expenditure of time, effort and cost. The center of each of the targets has a black polygonal shaped member 29 with its sides 31 corresponding in curvature to the rings 25 and spaced therefrom so as to be positioned in a white background and of the same color as the rings. Additionally, inwardly extending portions 32 are positioned intermediate the sides of each of the square shaped targets 23 and centrally disposed relative to a pair of adjacent rings 25 so that the target areas have identical colored backgrounds and are of the same shape or design, in order that the level of visual acuity is determined by the subject's ability to locate and distinguish a single closed ring from a plurality of open rings or a single broken ring from a plurality of closed rings. The broken and unbroken rings in the other groups are located in different positions relative to those in adjacent groups. It will be seen from inspection of the slide, shown in FIGURE 3, that each level of visual acuity is determined by the subject's ability to locate the solid or unbroken circle 25 in each group of four, disposed in different positions in the various groups. Moreover, tests in this type do not require the ability to read English letters. Further, the simple responses, such "top," "bottom," "right" or "left" can be indicated with hand movements in the case of young children or deaf mutes. By limiting the choice of correct responses to one in four reduces the possibility of guessing and is a psychological sound method of accurately testing either or both eyes of a subject at a minimum expenditure, time and effort.

Figure 4:
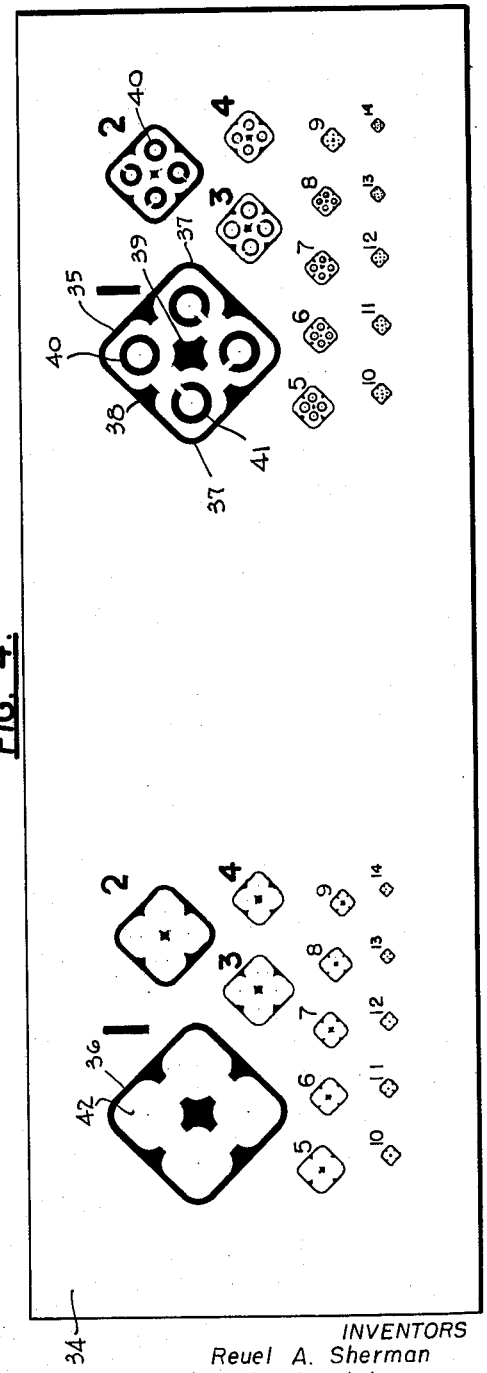
FIGURE 4 is a view similar to FIGURE 3 of a modified form of the invention for determining the acuity of one eye, such as a right eye, and in which the parts may be reversed to determine the acuity of the left eye.

In the form of the invention, disclosed in FIGURE 4, a stereoscopic slide is provided for determining the acuity in either eye and for purpose of illustration is shown for testing the right eye of the subject. Manifestly, it can be with equal efficiency and, upon reversal of the parts, used to test the left eye of the subject. As shown, the slide 34 has its front side or face separated into longitudinally spaced target areas in each of which are positioned a plurality of rows of targets 35 on the right side and 36 on the left side. The targets 35 on the right hand side of the slide 34 are of substantially square shape and have curved corners 37. Intermediate the sides of each target is an inwardly extending projection 38. A centrally disposed member 39 is located within the target, and an unbroken ring 40 and three broken rings 41 are positioned adjacent the corners of the target. It will be noted that the closed ring 40 in target #1 is at the top thereof, while in target #2 it is disposed adjacent the right hand corner and occupies different positions in the other progressive rows of targets.

The targets 36, on the left hand side of the slide, are of substantially the same size and shape as the corresponding targets on the right hand side thereof, but are provided with a blank or white background 42 instead of the closed and open rings. Thus, rings or solid circles are provided by the target 35 for testing the right eye, while a blank background 42 is presented to the left eye. This test uses similar patterns of broken and solid rings for the right eye, and simultaneously presents to the left eye a background identical to the one presented to the right eye, but minus the broken and solid rings. In this connection, it might be mentioned that the vision tester has been found suitable in conducting monocular acuity tests under binocular fixation, and the eyes continue to function as they do under normal seeing conditions.

As previously stated, the left eye may be tested by merely reversing the targets shown in FIGURE 4, so that the rings will be positioned on the left hand side and the blank targets on the right hand side of the slide.

In the modification disclosed in FIGURE 5, stereoscopic test slide 43 is provided with means for measuring the subject's ability to judge relative distances when all clues, except binocular triangulation, are eliminated. In this form, the right and left images are fused to form a single array in which one circle in each group of four appears to "float out" or project toward the subject. This result is accomplished by forming a plurality of targets, generally indicated by the numeral 44, and arranged in transverse rows identified as 1 to 9 inclusive. Similarly, the left hand side of the slide 43 has a plurality of targets, generally indicated by the numeral 45, similarly numbered 1 to 9. Each target may include four rings 46 and one of these rings in one of the groups, such as the ring 47, in target #1, on the right hand side of the slide and ring 48, in target #1, on the left hand side of the slide are eccentric, relative to their associated black field 49, while the other rings in the same group and in the remaining groups 2 to 9 inclusive are concentric, relative to their circular background or field 50. Thus, it will be seen that eccentric ring 47 on the right hand side of the slide 43 and eccentric ring 48 on the left hand side of this slide appear to "float out" or project toward the subject. In other words, the relative difficulty of each of the nine steps in each of the right hand and left hand targets is determined by the angular disparity of the "key" circle in each group, which may be separated as a percentage of theoretical maximum stereopsis, according to a well-known formula.

It is apparent that there has been provided by this invention a device by which the various objects and advantages hereinabove set forth are successfully achieved. Modifications of this invention not described herein will become apparent to those of ordinary skill in the art after reading the disclosure. Therefore, it is intended that the matter contained in the foregoing description and the accompanying drawings be interpreted in an illustrative sense, and not in a limiting sense, when consideration is given to the appended claims.

The slides or views of this application may be projected on a screen or used as a test chart, in the conventional manner. Moreover, it will be observed in all forms of the invention, a simple and efficient device is provided for accurately determining visual acuity by the subject's ability to locate solid or unbroken rings in each of the different targets, and in which the rings or curved hollow characters are so shaped and disposed that one of the rings constitutes a critical character, while the others are shaped to provide non-critical characters that may be used for testing vision either near or far and for measuring the depth or stereopsis and the ability of the subject to judge relative distances.

We claim:

1. A device for determining visual acuity including a plurality of substantially square-shaped spaced test targets progressively graduated as to size, each target including a plurality of visually observable rings, said rings having two characteristic shapes, one shape constituting an unbroken ring and the other constituting a broken ring, one of said rings having one characteristic shape constituting a distinguishing shape and the remainder having the other characteristic shape, the rings in each target having substantially the same internal and external diameters, rings being positioned adjacent each of the corners of the square targets, the rings of each target providing means for accurately determining the visual acuity of the eye under test, the said similar size rings of each target being proportionately and progressively graduated as to size with respect to those of another graduated sized target.

2. A device according to claim 1 having at least four rings, one disposed adjacent each corner.

3. A device according to claim 1 in which a complete unbroken ring is arranged in one corner of each target.

References Cited in the file of this patent

UNITED STATES PATENTS

| | | |
|---|---|---|
| 2,196,904 | Sherman | Apr. 9, 1940 |
| 2,196,905 | Sherman | Apr. 9, 1940 |
| 2,326,965 | Neumueller | Aug. 17, 1943 |

OTHER REFERENCES

Stereoscopic Photography, Judge text, 1926, Chapman and Hall, Lt.; London, England. Pages 134 and 135.

American Optical Vision, published by American Optical Co., vol. 30, No. 1. Page 12, 1946.

"Refraction and How to Refract," published 1900, Thornton, by Blakiston's Son and Co., page 79.

The Optician, Wilmut article, March 16, 1956, pages 221 and 222.